United States Patent [19]
Lawson et al.

[11] Patent Number: 5,351,797
[45] Date of Patent: Oct. 4, 1994

[54] RETRACTION SYSTEM FOR A POWER TOOL DRIVE SPINDLE

[75] Inventors: John R. Lawson; Robert H. Alexander, both of Colombia, S.C.

[73] Assignee: Cooper Industries, Inc., Houston, Tex.

[21] Appl. No.: 19,409

[22] Filed: Feb. 12, 1993

Related U.S. Application Data

[63] Continuation-in-part of Ser. No. 865,711, Feb. 24, 1992, abandoned, which is a continuation of Ser. No. 590,993, Oct. 1, 1990, abandoned.

[51] Int. Cl.⁵ ............................................. F16H 25/12
[52] U.S. Cl. .................... 192/141; 74/89.15; 173/19; 408/137
[58] Field of Search .............. 74/89.15; 192/141; 173/19; 408/137

[56] References Cited

U.S. PATENT DOCUMENTS

| | | | |
|---|---|---|---|
| 2,254,032 | 8/1941 | Fisher | 408/137 |
| 2,787,355 | 4/1957 | Dodge | 192/108 X |
| 2,796,767 | 6/1957 | Carpenter | 408/137 X |
| 3,459,057 | 8/1969 | Bonneric | 74/89.15 |
| 3,803,927 | 4/1974 | Lawler | 74/89.15 |
| 4,592,681 | 6/1986 | Pennison et al. | 173/19 X |
| 4,916,963 | 4/1990 | Takei | 74/89.15 X |
| 4,968,239 | 11/1990 | Inaba et al. | 74/89.15 X |

*Primary Examiner*—Allan D. Herrmann
*Attorney, Agent, or Firm*—Ronald L. Chichester; Eddie E. Scott; Nelson A. Blish

[57] ABSTRACT

A system for retracting the drive spindle of a power tool includes a drive shaft which has a spline portion and a threaded portion. During normal operation, the drive spindle is rotated by interconnection of a drive gear with the splined portion of the drive spindle. When it is desired to retract the drive spindle, a drive spindle feed gear is locked into position and the threaded engagement of the drive spindle feed gear and the drive spindle causes the drive spindle to retract.

7 Claims, 4 Drawing Sheets

RETRACTION SYSTEM FOR A POWER TOOL DRIVE SPINDLE

This application is a continuation-in-part of copending U.S. Ser. No. 07/865,711, filed Feb. 24, 1992, abandoned, which is a continuation of U.S. Ser. No. 07/590,993, filed Oct. 1, 1990, abandoned.

BACKGROUND OF THE INVENTION

The present invention pertains to power tools. More particularly, the present invention pertains to retraction systems for the drive spindles of power tools.

Power tools, particularly air or electrically driven power tools, include a drive spindle. The drive spindle normally operates at high rpm and rotates a drill chuck or other device in order to perform work on a work piece. The operation of the device requires advancement of the drive spindle into the work piece. For optimum performance of work on the work piece, the drive spindle is kept at high rotation speeds.

When the work has been accomplished, it is necessary to retract the drive spindle from the work piece. The fabrication of a rapid, reliable retraction system to retract a drive spindle from a work piece has caused problems for power tool designers for many years. Some prior art systems employ a drive dog mechanism for retraction of the drive spindle from the work piece. Such drive dog systems have a tendency to jam when operated at high speeds.

There is, therefore, a need in the art to provide a rapid, reliable retraction system for drive spindles of power tools that can be operated at high speeds.

SUMMARY OF THE INVENTION

The drive spindle retraction system of the present invention provides a device and method for retraction of a power tool drive spindle at high speed.

A retraction system for the drive spindle of a power tool includes a drive spindle feed gear and a drive spindle drive gear. The drive spindle feed gear is threadably interconnected with the drive spindle, and the drive spindle drive gear is connected to the drive spindle by splines. During the normal operation of the tool, the drive spindle drive gear causes rotation of the drive spindle by interconnection of the drive spindle drive gear with the splines formed on the drive spindle. During normal operation of the tool, the drive spindle drive gear and the drive spindle rotate together.

When the drive spindle is fully advanced into the work piece, and it is necessary to retract the drive spindle, the motion of the drive spindle feed gear is arrested. Because the drive spindle feed gear is threadably interconnected with the drive spindle, the continued rotation of the drive spindle by the drive spindle drive gear causes the drive spindle to back away form the work piece because of the interaction of the threads on the drive spindle with the threaded portion of the drive spindle feed gear.

BRIEF DESCRIPTION OF THE DRAWINGS

A better understanding of the drive spindle retraction system of the present invention may be had with regard to the drawings wherein.

DESCRIPTION OF THE EMBODIMENTS

Figure 1:
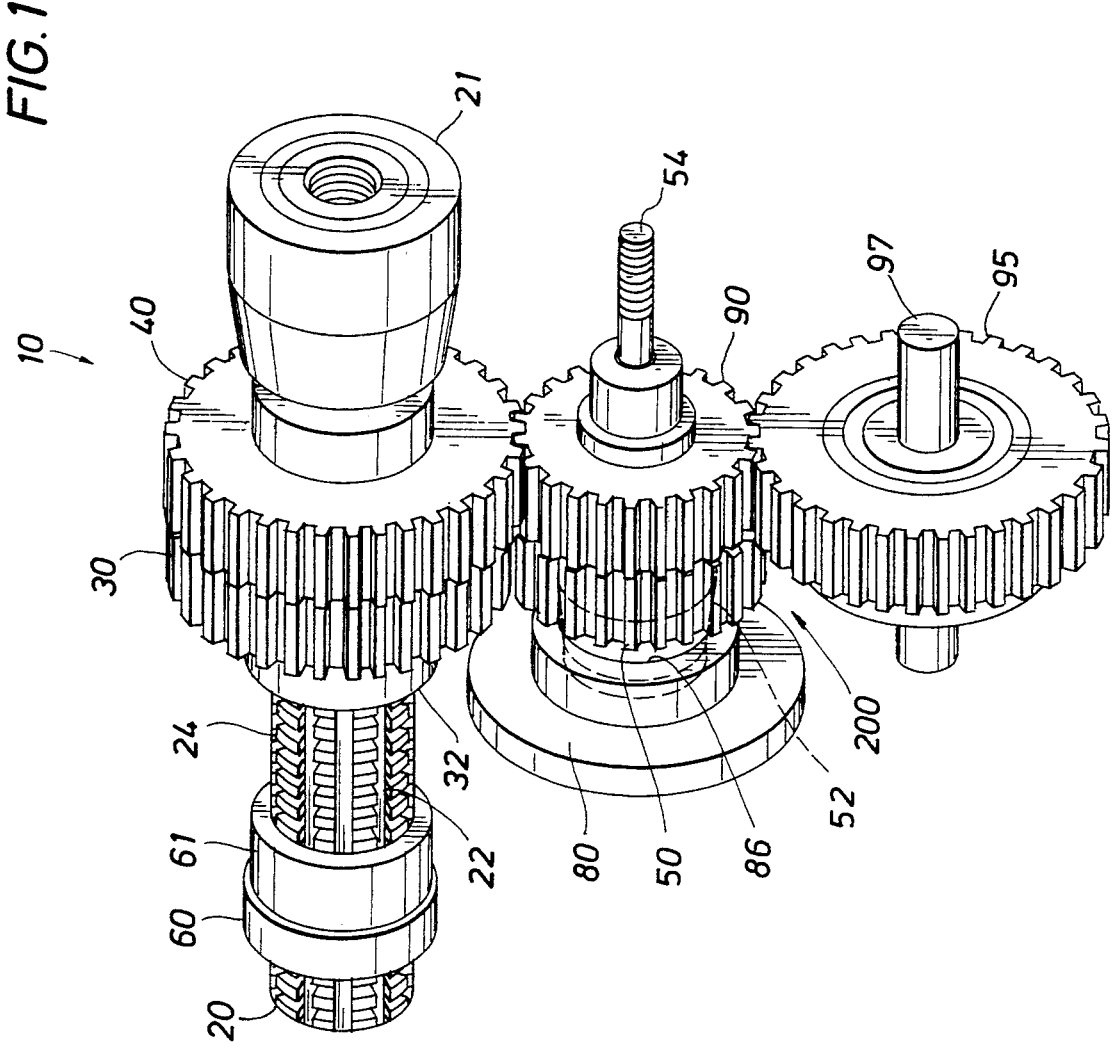
FIG. 1 is a schematic illustrating the extension operation of the drive spindle retraction system of the present invention.
Figure 6:
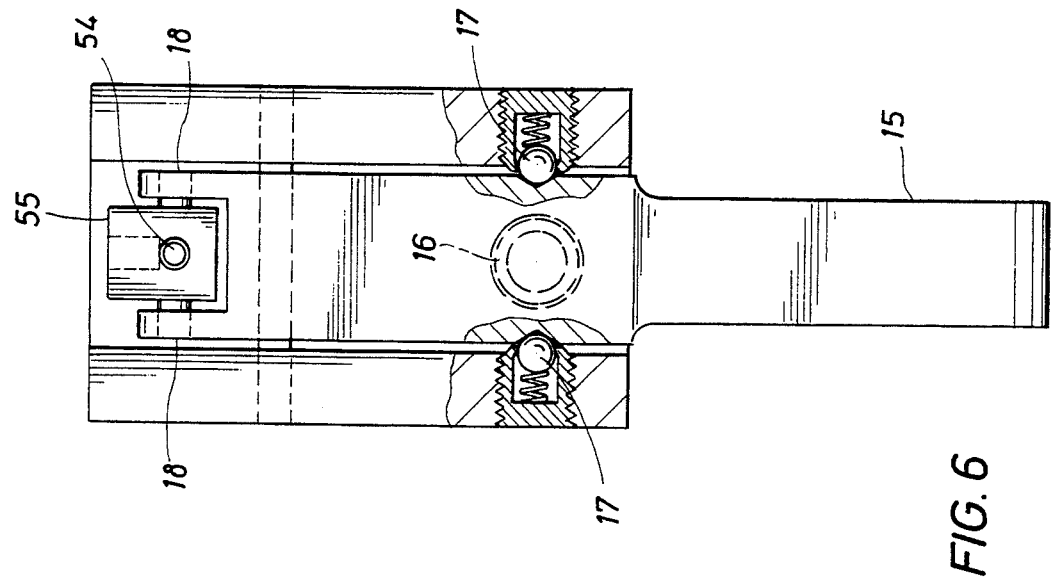
FIG. 6 is a cross sectional view along lines 6—6 of FIG. 4 showing the operation lever detents of the present invention.
Figure 2:
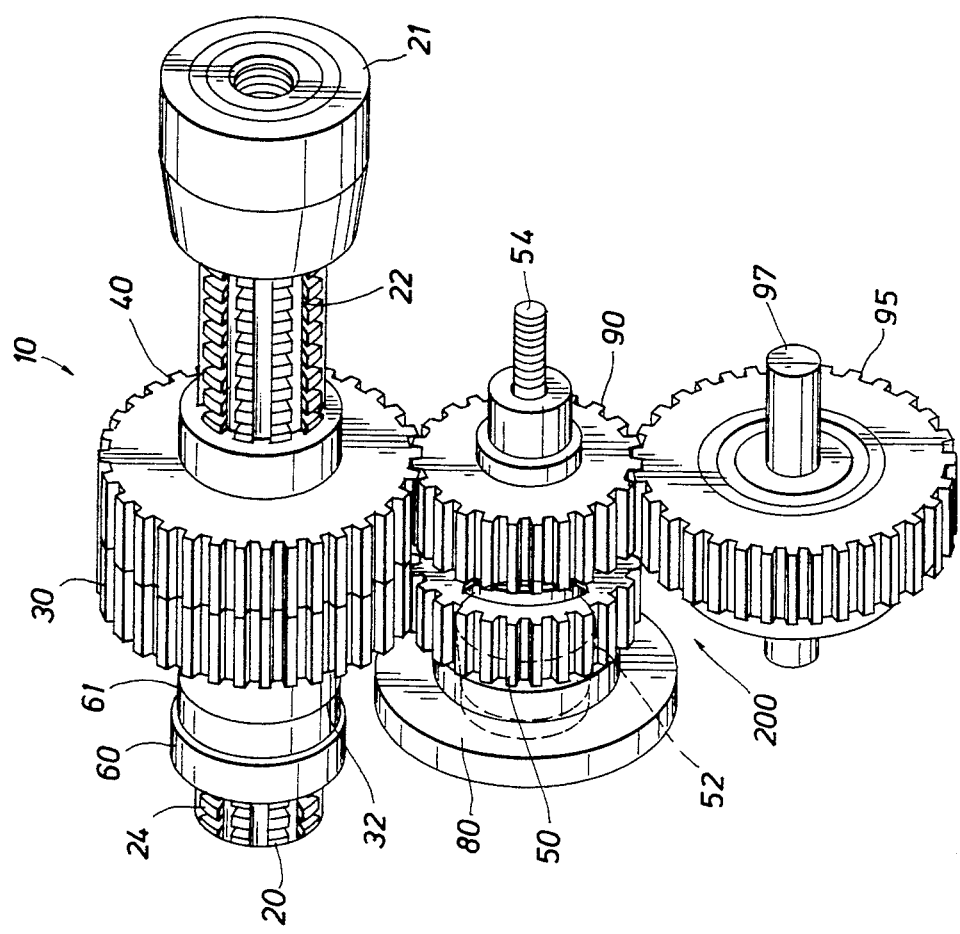
FIG. 2 is a schematic illustrating the retraction operation of the drive spindle retraction system of the present invention.

A better understanding of the power tool drive spindle retraction system of the present invention may be had by reference to FIGS. 1 and 2. Therein it may be seen that the drive spindle 20 of a power tool 10 includes a splined portion 22 and a threaded portion 24 as shown in FIG. 1. To increase the length of travel for the drive spindle 20, the preferred embodiment of the present invention has the entire length of the drive spindle threaded and said threading is interrupted with splines as shown in FIG. 2. Mounted on drive spindle 20 is a spindle drive gear 40. The rotation of spindle drive gear 40 is imparted to drive spindle 20 by the splined interengagement 42 of the spindle drive gear 40 and drive spindle 20.

Mounted on the threaded portion 24 of drive spindle 20 is spindle feed gear 30. Spindle feed gear 30 has a threadable engagement 32 with drive spindle 20. In the preferred embodiment, the drive spindle 20 will be caused to rotate against the work piece in a clockwise, or right-hand, rotation. If the drive spindle 20 is designed to rotate in a clockwise rotation, then the threaded portion 24 must have a counterclockwise or left-hand rotation. Conversely, if the drive spindle 20 is designed to rotate in a counterclockwise rotation, then the threaded portion 24 must be in a clockwise or right-hand rotation. This counter-threading is necessary so that the drive spindle 20 will be moved away from the work piece when spindle feed gear 30 has stopped rotating.

Enmeshed with spindle feed gear 30 is spindle feed idler gear 50 as shown in FIG. 1. Likewise, enmeshing with spindle drive gear 40, and coaxial with spindle feed idler gear 50, is spindle drive gear drive gear 90. Spindle drive gear drive gear 90 is enmeshed with the drive gear 95 as shown in FIG. 1. Drive gear 95 is rotationally connected to drive shaft 97. Drive shaft 97 is connected to a suitable torque producing device (not shown).

Figure 3:
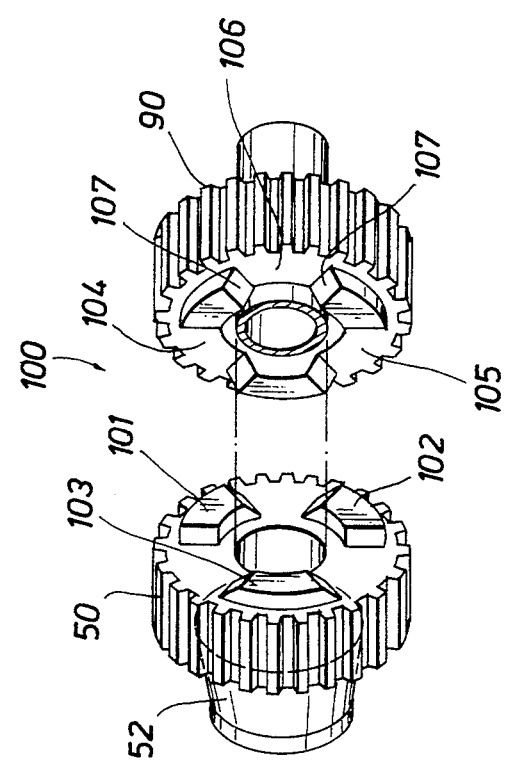
FIG. 3 is an exploded view showing the lugged interconnection of two gears within the drive spindle retraction system of the present invention.

When the operator desires to have drive spindle 20 advance to, and work upon, the work piece, the operator moves lever 15 and compresses spring until lever 15 reaches and seats within detent 17. This operation of lever 15 about lever pivot 18 causes the shaft 54, which is connected to lever 15 via lever block 55, to force spindle feed idler gear 50 against spindle drive gear drive gear 90. Spindle feed idler gear 50 engages 100 spindle drive gear drive gear 90 through a series of angled lugs 101, 102 and 103 in spindle feed idler gear 50 and corresponding angled receptacles 104, 105 and 106 having angled walls 107 in spindle drive gear 90, as shown in FIG. 3.

It should be noted that the present invention utilizes a gear ratio differential system to advance the drive spindle 20 toward the work piece. The differential system, consists of a spindle, such as drive spindle which is rotated by a gear, such as spindle drive gear 40, through a splined interengagement. Another gear, such as spindle feed gear 30, which has a slightly higher gear ratio than the drive gear rotates faster than the spindle, and through a threaded engagement with said spindle, advances the spindle in a given direction. In the present invention, spindle feed gear 30 is slightly smaller, or has a slightly higher gear ratio than spindle drive gear 40. Correspondingly, spindle feed idler gear 50 has a proportionally lower gear ratio to spindle feed drive gear drive gear 90. As spindle feed idler gear 50 is enmeshed 100 coaxially with spindle drive gear drive gear 90, both rotate at the rate. Because spindle feed idler gear 50 rotates at the same rate as spindle drive gear drive gear 90, spindle feed gear 30 rotates at a slightly faster rate than spindle drive gear 40 due to the latter's different gear ratios. It is this difference in gear ratio, with a consequent difference in rotation rate between drive spindle 20 and spindle feed gear 30, and the threaded engagement 32 therebetween, that causes the advancement of the drive spindle 20 toward the work piece. This difference in gear ratio may vary, depending upon the desired speed of advancement of the drive spindle 20 toward the work piece. In the preferred embodiment, with the drive spindle 20 rotating clockwise, the spindle feed gear 30 has a one percent greater gear ratio than the spindle drive gear 40.

To govern the length of travel for the drive spindle 20, the present invention uses a collar process well known in the art. In this case, two collars, designated 60 and 61 are used to regulate the length of travel for drive spindle 20. Collars 60 and 61 are essentially threaded nuts which are positioned on drive spindle 20. Once positioned, collar 60 is torqued tightly against collar 61 to rotationally affix both collar 60 and collar 61 at the desired position on drive spindle 20. The length of advance of drive spindle 20 may be changed by torquing collar 60 away from collar 61, reposition both collars away from or toward the spindle feed gear 30 to increase or decrease, respectively, the travel length of drive spindle 20, and then retorquing the collars 60 and 61 against one another to again rotationally affix their position along drive spindle 20. When drive spindle 20 advances toward the work piece, collar 61 is moved toward spindle feed gear 30. When collar 61, which is rotatably fixed to drive spindle 20, contacts spindle feed gear 30, spindle feed gear 30 is caused to rotate at the same rate as the drive spindle 20. Because of the different gear ratios between spindle feed idler gear 50 and spindle drive gear drive gear 90 and the equivalent rotation rates of spindle feed gear 30 and spindle drive gear 40, angled lugs 101, 102 and 103 slide against the angled walls 107 of angled receptacles 104, 105 and 106 and eventually force the spindle feed idler gear 50 away from spindle feed drive gear drive gear 90. When spindle feed idler gear 50 is move away from spindle drive gear drive gear 90, shaft 54, which moves laterally with spindle feed idler gear 50, forces lever block 55 toward spindle drive gear drive gear 90. This movement of the lever block 55 causes lever 15 to pivot about lever pivot 18 and forces lever 15 out of its detents 17. Once lever 15 is out of its detent 17 setting, the previously compressed spring 16 pivots lever 15 to force lever block 55, shaft 54 and spindle feed idler gear 50 toward stationary cup 80. Spindle feed idler gear 50 is provided with a cone 52, as shown in FIG. 3. The combination of cone 52 and the surface 86 of cup 80 provides a tapered interfitment with which spindle feed idler gear 50 and cup 80 frictionally engage each other when the former is forced against the latter.

Figure 4:
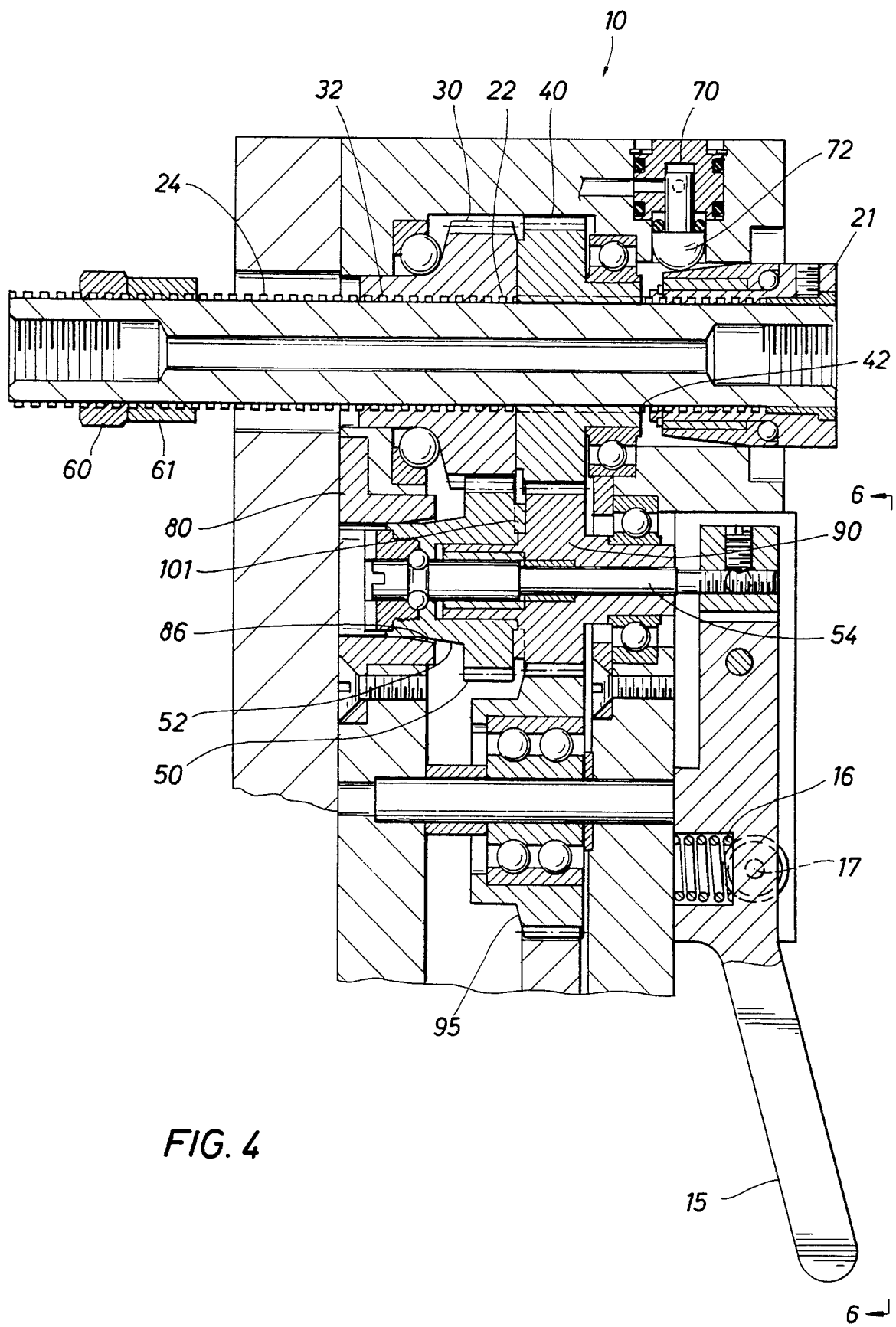
FIG. 4 is a cross-sectional view of a power tool employing the drive spindle retraction system of the present invention in the extension operation.
Figure 5:
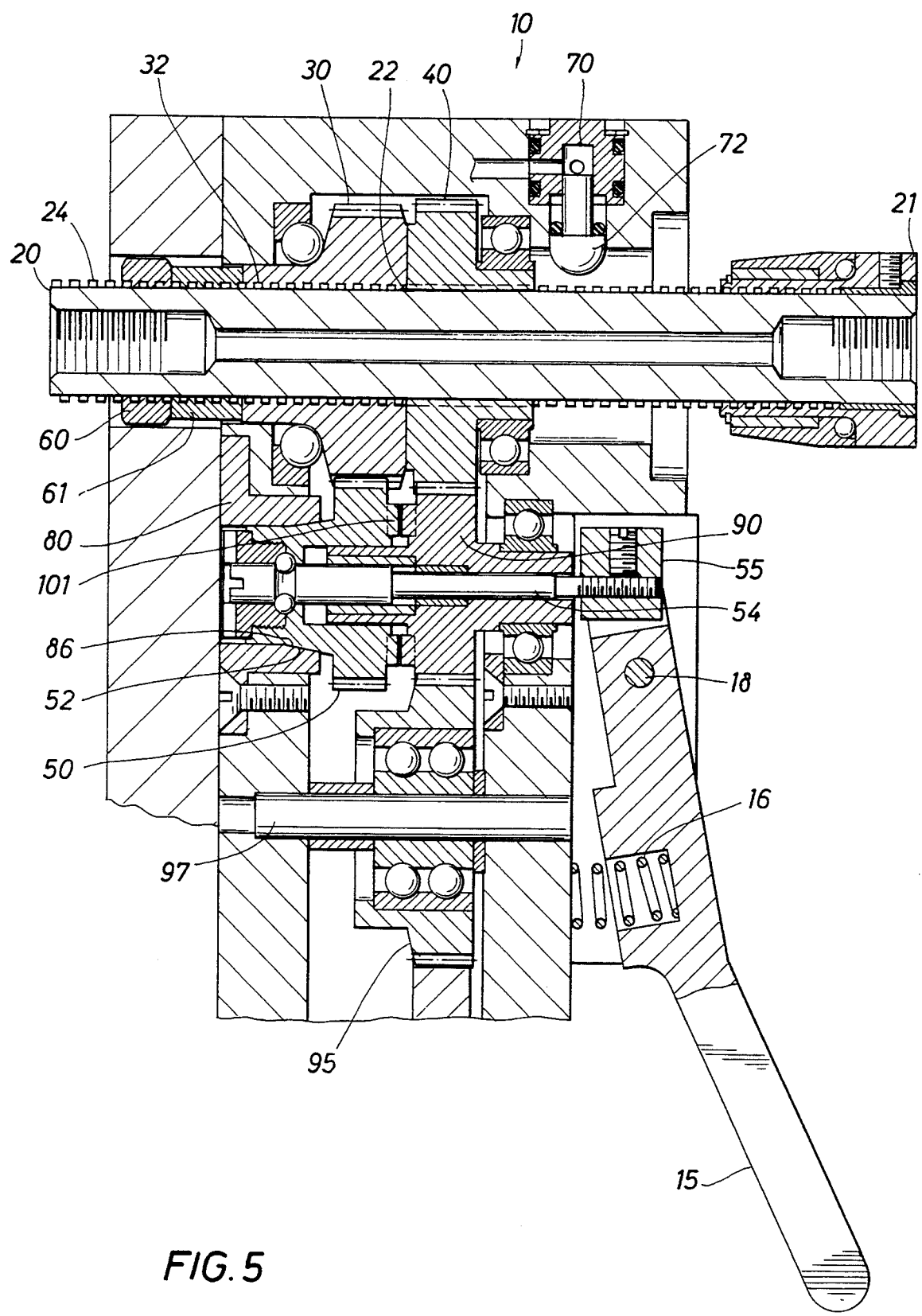
FIG. 5 is a cross-sectional view of a power tool employing the drive spindle retraction system of the present invention in the retraction operation.

Upon frictional engagement with the stationary cup 80, spindle feed idler gear 50 is forced to stop rotating which, in turn, causes spindle feed gear 30 to stop rotating. As spindle drive gear 40 continues to rotate via drive gear 95 through spindle drive gear drive gear 90, the threaded engagement 32 with the now stationary spindle feed gear 50 forces drive spindle 20 away from the work piece. In the preferred embodiment of the invention, as shown in FIG. 4, the drive spindle 20 will continue to move away from the work piece until the drive chuck 21 engages actuator plunger 72. The actuator plunger 72 is connected to a power flow switch or valve 70. Consequently, when the drive chuck 21 hits plunger 72, the latter commands the valve 70 to interrupt the flow of power to the power tool 10, and the tool will cease operation. Other methods of shutting off the power to tool 10 will be obvious to those of ordinary skill in the art. Such methods can be based upon the movement of the drive spindle 20 away from the work piece. It will also be understood by those of ordinary skill in the art that numerous methods of arresting the motion of spindle feed idler gear 50 may be used without departing from the scope of the invention.

There is thereby provided by the drive spindle retraction system of the present invention a method for rapidly and reliably retracting the drive spindle of a power tool.

It will be understood by those of ordinary skill in the art that modifications may be made to the disclosed retraction system for a drive spindle of a power tool. Such modifications shall remain within the scope of the present invention and be included within the claims.

We claim:
1. A retraction system for a power tool comprising:
   a drive spindle, said drive spindle having:
      a threaded portion; and
      a splined portion;
   a spindle feed gear, said spindle feed gear threadably interconnected with said threaded portion of said drive spindle;
   a spindle drive gear, said spindle drive gear slidably interconnected with said splined portion of said drive spindle;
   a spindle feed idler gear, said spindle feed idler gear constructed and arranged to intermesh with said spindle feed gear;
   a cup member; said cup member arresting the rotational motion of said spindle feed idler gear by tapered interfitment with said cup member;
   whereby, when the rotational motion of said spindle feed gear is arrested, the continued rotation of said drive spindle caused by the engagement of said spindle drive gear with the splines of said drive spindle will cause axial movement of said drive spindle through said spindle drive gear by the threaded engagement of said drive spindle with said spindle feed gear.

2. The retraction system as defined in claim 1 wherein the orientation of the threads in said threaded portion of said drive spindle is directly counter to the advancing rotation of said drive spindle.

3. The retraction system as defined in claim 1 further including a collar which is attached to said drive spindle; and means for disengaging said spindle feed idler gear from said spindle drive gear drive gear, said means for disengaging being activated when said spindle feed gear contacts said collar.

4. The retraction system as defined in claim 1 further including means for stopping the flow of power to the power tool, said means for stopping the flow of power to the power tool being engaged upon full retraction of said drive spindle.

5. A retraction system for a power tool comprising:

a drive spindle, said drive spindle having:

a threaded portion; and a splined portion;

a spindle feed gear, said spindle feed gear threadably interconnected with said threaded portion of said drive spindle;

a spindle drive gear, said spindle drive gear slidably interconnected with said splined portion of said drive spindle;

a spindle feed idler gear, said spindle feed idler gear constructed and arranged to engage said spindle feed gear;

a spindle drive gear drive gear, said spindle drive gear drive gear constructed and arranged to engage said spindle drive gear;

a lug engagement system located on said spindle drive gear drive gear and said spindle feed idler gear, said lug engagement system constructed and arranged to cause said spindle drive gear drive gear and said spindle feed idler gear to rotate together;

a collar which is affixed to said drive spindle;

means for arresting the rotational motion of said spindle feed idler gear; and means for disengaging said spindle feed idler gear from said spindle drive gear drive gear, said means for disengaging being activated when said spindle feed gear contacts said collar;

whereby when the rotation of said spindle feed idler gear is arrested, the continued rotation of said drive spindle caused by the engagement of the spindle drive gear with the splines on said drive spindle will cause axial motion of the drive spindle with respect to the spindle drive gear by the threaded engagement of the drive spindle with the spindle feed gear.

6. The retraction system as defined in claim 5 further including means for stopping the flow of power to the power tool, said means for stopping the flow of power to the power tool being engaged upon full retraction of said drive spindle.

7. A method for retracting a drive spindle on a power tool, said method comprising the steps of:

providing a drive spindle having a threaded portion and a splined portion;

threadably mounting a spindle feed gear on said drive spindle;

mounting a spindle drive gear on said drive spindle by interenagement with the splined portion of said drive spindle;

rotating said drive spindle with said spindle drive gear by the intermeshing of said spindle drive gear with a spindle drive gear drive gear;

providing a spindle feed idler gear;

intermeshing said spindle feed gear with said spindle feed idler gear;

mechanically interconnecting said spindle drive gear drive gear with said spindle feed idler gear so that said spindle drive gear drive gear and said spindle feed idler gear rotate together;

providing a cup which is constructed and arranged to arrest the motion of said spindle feed idler gear by a tapered interfitment; and arresting the motion of said spindle feed idler gear by engagement with said cup;

whereby the continued rotation of said drive spindle caused by said spindle drive gear will cause said drive spindle to retract through said drive spindle drive gear by the threadable engagement of said spindle feed gear with the drive spindle.

* * * * *